(12) United States Patent
Clare

(10) Patent No.: US 12,275,106 B2
(45) Date of Patent: Apr. 15, 2025

(54) REPAIR SYSTEM FOR A SURFACE OF A WORKPIECE

(71) Applicant: ROLLS-ROYCE plc, London (GB)

(72) Inventor: Adam Thomas Clare, Nottingham (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 18/525,032

(22) Filed: Nov. 30, 2023

(65) Prior Publication Data

US 2024/0189952 A1 Jun. 13, 2024

(30) Foreign Application Priority Data

Dec. 7, 2022 (GB) ..................................... 2218373

(51) Int. Cl.
*B24B 19/14* (2006.01)
*B23P 6/00* (2006.01)
*B24B 27/00* (2006.01)

(52) U.S. Cl.
CPC .............. *B23P 6/002* (2013.01); *B24B 19/14* (2013.01); *B24B 27/0023* (2013.01); *B24B 27/0076* (2013.01)

(58) Field of Classification Search
CPC . B24B 19/14; B24B 27/0023; B24B 27/0038; B24B 27/0046; B24B 27/0053; B24B 27/0076; B24B 33/086
See application file for complete search history.

(56) References Cited

U.S. PATENT DOCUMENTS

2022/0126319 A1 4/2022 Richardson et al.

FOREIGN PATENT DOCUMENTS

| CN | 104842232 A | 8/2015 | |
|---|---|---|---|
| CN | 112571067 A | 3/2021 | |
| CN | 113770880 A | 12/2021 | |
| FR | 2670149 A1 * | 6/1992 | ......... B23Q 17/2216 |

OTHER PUBLICATIONS

Machine Translation of FR 2670149 A1 (Year: 1992).*
Machine Translation of CN 104842232 A (Year: 2015).*
Machine translation of FR 2670149 A1 (Year: 1993).*
May 10, 2024 Search Report issued in European Patent Application No. 23208608.2.
Jun. 5, 2023 Combined Search and Examination Report issued in British Patent Application No. GB2218373.5.

* cited by examiner

*Primary Examiner* — Christopher J. Besler
(74) *Attorney, Agent, or Firm* — Oliff PLC

(57) ABSTRACT

A repair system for repairing a surface of a workpiece includes a first tool configured to rotate in a first direction. The first tool contacts the surface of the workpiece during the rotation of the first tool in order to repair the surface of the workpiece. The repair system further includes a second tool configured to rotate in a second direction opposite to the first direction. The second tool contacts the surface of the workpiece during the rotation of the second tool in order to repair the surface of the workpiece. The repair system further includes a drive mechanism coupled to each of the first tool and the second tool.

15 Claims, 3 Drawing Sheets

REPAIR SYSTEM FOR A SURFACE OF A WORKPIECE

This specification is based upon and claims the benefit of priority from UK Patent Application Number 2218373.5 filed on 7 Dec. 2022, the entire contents of which are incorporated herein by reference.

BACKGROUND

Field of the Disclosure

The present disclosure relates generally to repairing of a surface of a workpiece. Particularly, the present disclosure relates to a repair system for repairing a surface of a workpiece.

Background of the Disclosure

A machine, for example, a gas turbine engine, requires repair (e.g., in-situ repair) of one or more components of the machine that are usually damaged after numerous working cycles of the machine. For example, after some work operations of the machine, the machine may be damaged due to defects, such as cracks and irregularities on the one or more surfaces of the machine. In some cases, unwanted material may be accumulated or deposited on the one or more surfaces of the machine after some work operations of the machine. Such damaged surfaces/portions need to be repaired before further use of the machine in order to maintain an appropriate efficiency of the machine and to avoid any accidents associated with the machine and its users.

Conventionally, in some cases, the damaged surface of the machine (or a component of the machine) may be repaired by performing various processes, such as localized grinding, localized blending, and the like, by single point repair tools. Localized grinding and localized blending are commonly used techniques for repairing defects on aerospace components where cracks may limit the lifetime of the aerospace components. In conventional repair techniques, reaction forces may be generated when a single point repair tool (grinding tools, blending tools, etc.) engages with a component that needs to be repaired. In other words, the repair tool may deviate from a target location. This may cause unwanted material removal and a need for additional rework. The reaction forces associated with single point repair tools may present a significant challenge in precise use of the conventional repair techniques at deep repair locations and in-situ applications.

Therefore, there is a need for a system or a technique for repairing a surface of a workpiece/component that overcomes the above-mentioned limitations of the conventional repairing techniques.

SUMMARY OF THE DISCLOSURE

According to the present disclosure, there is provided a repair system for repairing a surface of a workpiece. The repair system includes a first tool configured to rotate in a first direction. The first tool contacts the surface of the workpiece during the rotation of the first tool in order to repair the surface of the workpiece. The repair system further includes a second tool configured to rotate in a second direction opposite to the first direction. The second tool contacts the surface of the workpiece during the rotation of the second tool in order to repair the surface of the workpiece. The repair system further includes a drive mechanism coupled to each of the first tool and the second tool. The drive mechanism is configured to rotate each of the first tool and the second tool and cause counter-rotation of the first tool and the second tool, such that the first tool rotates in the first direction and the second tool rotates in the second direction.

The repair system of the present disclosure may be used to perform repair operations, such as blending or grinding, for repairing the surface of the workpiece. Due to the counter-rotation of the first tool and the second tool, the repair system of the present disclosure does not deploy a single point repair tool. As a result, minimal reaction forces may be generated when the first tool rotates in the first direction and the second tool rotates in the opposing second direction during the repair process, and each of the first tool and the second tool contacts the surface of the workpiece during the counter-rotation. Therefore, in comparison to conventional single point repair tools, the repair system of the present disclosure may involve relatively less reaction forces between the workpiece and the first and second tools. In other words, the counter-rotation of the first tool and the second tool may allow cancellation of tool-work engagement forces during a repair operation.

Due to the counter-rotation of the first tool and the second tool, the first tool and the second tool may not deviate from a target location while repairing the surface of the workpiece. This may reduce unwanted material removal and additional rework. The counter-rotation of the first tool and the second tool may offer a precise use of the repair system for repair operations at deep repair locations and in-situ applications. The repair system of the present disclosure may be effectively used in repair operations of various components of aeroengines.

Moreover, the repair system of the present disclosure may reduce the required level of operator expertise thereby allowing facile automation of a repair technique. The repair system may be used in micro scale application as well as macro scale applications.

In some embodiments, the drive mechanism includes a drive motor. The drive mechanism further includes a main shaft coupled to and configured to be driven by the drive motor. The drive mechanism further includes a first shaft mechanically coupled to the first tool. The drive mechanism further includes a first gear fixed to and mounted on the first shaft. The drive mechanism further includes a second shaft mechanically coupled to the second tool. The drive mechanism further includes a second gear fixed to and mounted on the second shaft. The drive mechanism further includes a third shaft. The drive mechanism further includes a third gear fixed to and mounted on the third shaft. The third gear is meshed with the first gear. The drive mechanism further includes a fourth shaft. The drive mechanism further includes a fourth gear fixed to and mounted on the fourth shaft. The fourth gear is meshed with each of the second gear and the third gear. The drive mechanism further includes a flexible coupling configured to mechanically couple the main shaft to one of the first shaft, the second shaft, the third shaft, and the fourth shaft. Upon rotation of the main shaft and the mechanical coupling of the main shaft to one of the first shaft, the second shaft, the third shaft, and the fourth shaft, the first tool rotates in the first direction and the second tool rotates in the second direction. The purpose of the flexible coupling is to transmit torque from one piece of rotating equipment to another where there is a slight amount of misalignment between the two rotating equipment. The flexible coupling may obtain its flexibility from loose-fitting parts by rolling, sliding, or from both with some flexure of material. The flexible coupling may include a spring, a hinge, an accordion-shaped bellow, or a ball joint. In some cases, the flexible coupling may an input coupler and an output coupler.

Such an arrangement of various gears and shafts in the drive mechanism leads to the counter-rotation of the first tool and the second tool. The inclusion of the flexible coupling allows the mechanical coupling of the main shaft to any one of the first shaft, the second shaft, the third shaft, and the fourth shaft. The drive mechanism causes the first tool and the second tool to rotate in opposing directions, but at the same speed. This improves self-balancing capability of the repair system of the present disclosure during a repair operation.

In some embodiments, the repair system further includes a load sensor (i.e., a load cell) mounted on one of the first shaft and the second shaft and configured to detect a torque of the corresponding first shaft or the second shaft. The load sensor generally converts tension and compression forces into a corresponding electrical signal. In the repair system, the load sensor may detect a load applied to the corresponding first shaft or the second shaft. Through the electrical signal generated by the load sensor, an operator may check and validate the repair operation being performed by the repair system of the present disclosure. The load sensor may be a hydraulic load sensor or a pneumatic load sensor. The most common type of load sensor is a strain gauge load sensor.

In some embodiments, the drive mechanism further includes a first bearing to rotatably support the first shaft and a second bearing to rotatably support the second shaft. The first bearing assists the rotation of the first shaft and the second bearing assists the rotation of the second shaft. In other words, the first bearing allows the first shaft to rotate smoothly, and the second bearing allows the second shaft to rotate smoothly.

In some embodiments, the repair system further includes a casing at least partially enclosing the drive mechanism. Each of the first shaft and the second shaft extends at least partially outside the casing. The casing may be in the form of a sleeve and at least partially houses various components of the drive mechanism. The casing may protect the drive mechanism by minimizing contact between debris and the components of the drive mechanism during a repair operation.

In some embodiments, a width of the casing is about 12 millimetres. Therefore, the repair system may be used to perform repair operations in confined spaces.

In some embodiments, the repair system further includes a pair of scarifier heads and a pair of blending heads configured to be interchangeably and removably mounted on the first tool and the second tool, respectively. Upon mounting of the pair of scarifier heads on the first tool and the second tool, respectively, the repair system may repair the surface of the workpiece by grinding. Upon mounting of the pair of blending heads on the first tool and the second tool, respectively, the repair system may repair the surface of the workpiece by blending. Therefore, any one of the blending and the grinding can be performed by the repair system based on application requirements.

In some embodiments, upon mounting of the pair of blending heads on the first tool and the second tool, respectively, the counter-rotation of the first tool and the second tool causes a deposition of a coating on the surface in order to repair the surface of the workpiece. The deposition of the coating on the surface of the workpiece may increase the working life of the workpiece. The coating may be a thermal barrier coating which causes the workpiece to withstand high temperatures, temperature cycling, and stress conditions.

In some embodiments, upon mounting of the pair of scarifier heads on the first tool and the second tool, respectively, the counter-rotation of the first tool and the second tool causes a removal of unwanted material from the surface in order to repair the surface of the workpiece. The removal of the unwanted material from the surface of the workpiece may increase the working life of the workpiece. As a result, a machine including the repaired workpiece may work efficiently and effectively.

In some embodiments, each of the pair of scarifier heads and the pair of blending heads is made of a material including at least steel, tungsten carbide, or plastic. Such a material of the pair of scarifier heads (i.e., grinding heads) and the pair of blending heads may enhance repair operations, such as blending or grinding.

In some embodiments, a speed of rotation of each of the first tool and the second tool is between 100 revolutions per minute (rpm) and 25000 rpm. This range of speed of rotation of the first tool and the second tool enables the repair system to perform repair operations based on different application attributes.

In some embodiments, each of the first tool and the second tool is a spherical ball. In other embodiments, each of the first tool and the second tool may be elliptical, teardrop or oval in shape.

In some embodiments, the repair system further includes a port disposed between and spaced apart from the first tool and the second tool. The port may be an opening that opens up into a space between the first tool and the second tool.

In some embodiments, the port allows a lubricant or a coolant to flow towards the surface of the workpiece which is to be repaired. In some applications, flow of the lubricant or the coolant towards the surface of the workpiece may enhance the repair operation of the workpiece, enhance thermal conditions during the operation and help to remove debris.

In some embodiments, the port allows evacuation of debris from the surface of the workpiece after the surface is repaired. In some applications, evacuation of the debris from the surface of the workpiece may ensure smooth functioning of the workpiece.

In some embodiments, the workpiece may be a component of a gas turbine engine.

Throughout this specification and in the claims that follow, unless the context requires otherwise, the word "comprise" or variations such as "comprises" and "comprising", will be understood to imply the inclusion of a stated integer or group of integers but not the exclusion of any other stated integer or group of integers.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Aspects and embodiments of the present disclosure will now be discussed with reference to the accompanying figures. Further aspects and embodiments will be apparent to those skilled in the art.

Figure 1:
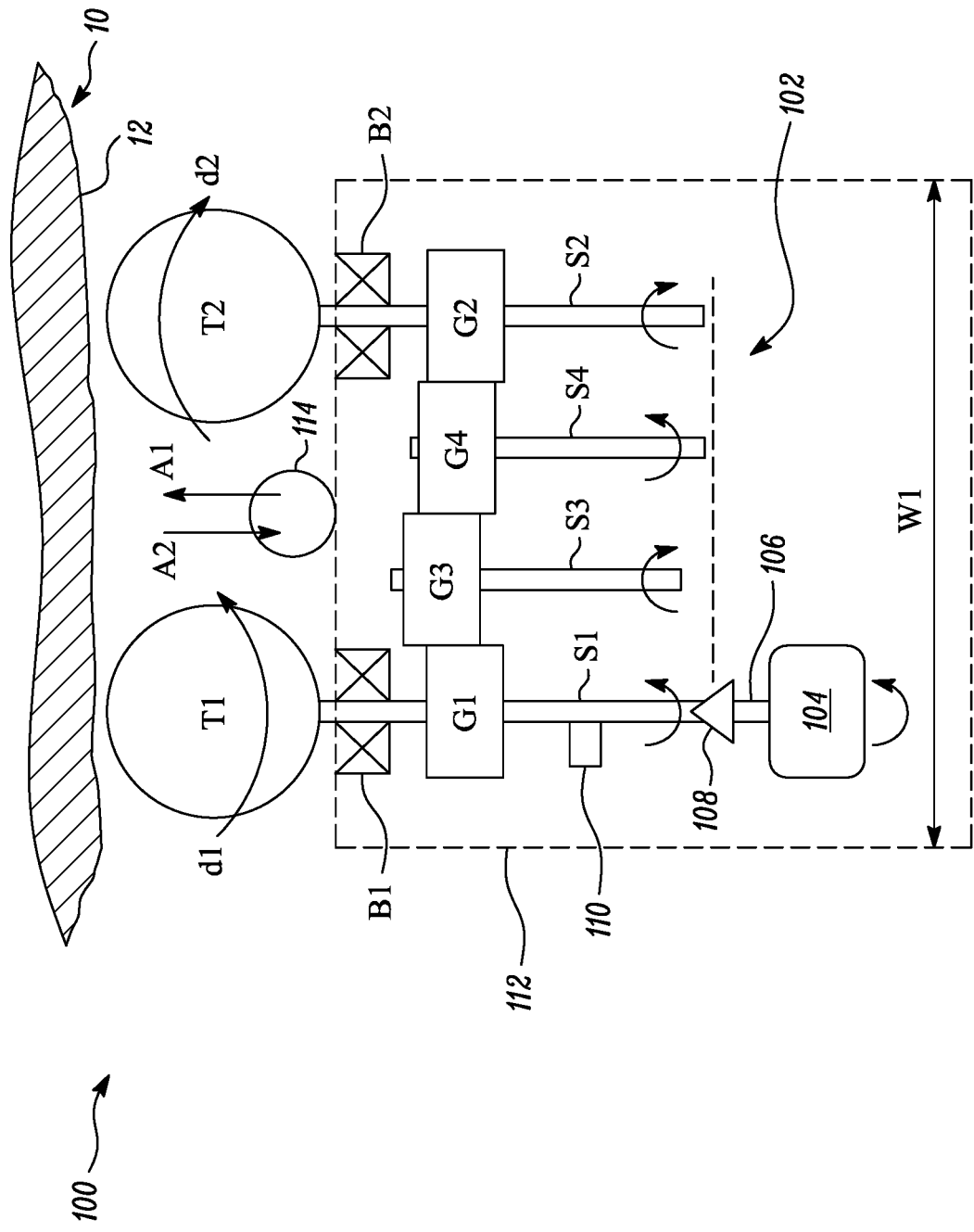
FIG. 1 is a schematic top view of a repair system, according to an embodiment of the present disclosure.

FIG. 1 is a schematic top view of a repair system 100 for repairing a surface 12 of a workpiece 10, according to an embodiment of the present disclosure. The workpiece 10 may be a component of a gas turbine engine (not shown). In some cases, the workpiece 10 may be a compressor blade or a turbine blade of the gas turbine engine. The repair system 100 may be used for in-situ repair of a machine, such as the gas turbine engine.

The repair system 100 includes a first tool T1 configured to rotate in a first direction d1. The first tool T1 contacts the surface 12 of the workpiece 10 during the rotation of the first tool T1 in order to repair the surface 12 of the workpiece 10. The repair system 100 further includes a second tool T2 configured to rotate in a second direction d2 opposite to the first direction d1. The second tool T2 contacts the surface 12 of the workpiece 10 during the rotation of the second tool T2 in order to repair the surface 12 of the workpiece 10.

In the illustrated embodiment of FIG. 1, the first direction d1 is the anti-clockwise direction and the second direction d2 is the clockwise direction. In other embodiments, the first direction d1 may be the clockwise direction and the second direction d2 may be the anti-clockwise direction. In some embodiments, a speed of rotation of each of the first tool T1 and the second tool T2 is between 100 revolutions per minute (rpm) and 25000 rpm. This range of speed of rotation of the first tool T1 and the second tool T2 enables the repair system 100 to perform repair operations based on different application attributes. In some embodiments, each of the first tool T1 and the second tool T2 is a spherical ball. In other embodiments, each of the first tool T1 and the second tool T2 may be elliptical or oval in shape.

The repair system 100 further includes a drive mechanism 102 coupled to each of the first tool T1 and the second tool T2. The drive mechanism 102 is configured to rotate each of the first tool T1 and the second tool T2 and cause counter-rotation of the first tool T1 and the second tool T2, such that the first tool T1 rotates in the first direction d1 and the second tool T2 rotates in the second direction d2.

The drive mechanism 102 includes a drive motor 104. The drive motor 104 may be a stepper motor. The drive mechanism 102 further includes a main shaft 106 coupled to and configured to be driven by the drive motor 104. The drive mechanism 102 further includes a first shaft S1 mechanically coupled to the first tool T1. The drive mechanism 102 further includes a first gear G1 fixed to and mounted on the first shaft S1. The drive mechanism 102 further includes a second shaft S2 mechanically coupled to the second tool T2. The drive mechanism 102 further includes a second gear G2 fixed to and mounted on the second shaft S2. The drive mechanism 102 further includes a third shaft S3 and a third gear G3 fixed to and mounted on the third shaft S3. The third gear G3 is meshed with the first gear G1. The drive mechanism 102 further includes a fourth shaft S4 and a fourth gear G4 fixed to and mounted on the fourth shaft S4. The fourth gear G4 is meshed with each of the second gear G2 and the third gear G3. The drive mechanism 102 further includes a flexible coupling 108 configured to mechanically couple the main shaft 106 to one of the first shaft S1, the second shaft S2, the third shaft S3, and the fourth shaft S4. The first gear G1, the second gear G2, the third gear G3, and the fourth gear G4 are arranged such that rotational power from one gear is transferred to other gear.

While the illustrated embodiment in FIG. 1 shows the use of four gears and corresponding four shafts to cause the counter-rotation of the first tool T1 and the second tool T2, the counter rotation of the first tool T1 and the second tool T2 can also be caused by using only two gears and corresponding two shafts. For example, out of all the gears and the shafts, the drive mechanism 102 may only include the main shaft 106, the first gear G1, the first shaft S1 mechanically coupled to the first tool T1, the second gear G2 meshed with the first gear G1, and the second shaft S2. In such an embodiment, the flexible coupling 108 may mechanically couple the main shaft 106 to one of the first shaft S1 and the second shaft S2. Therefore, arrangement of gears and shafts in the drive mechanism 102 may be altered to cause the counter-rotation of the first tool T1 and the second tool T2.

In the illustrated embodiment of FIG. 1, the flexible coupling 108 mechanically couples the main shaft 106 to the first shaft S1. In some embodiments, the flexible coupling 108 may mechanically couple the main shaft 106 to the second shaft S2. In other embodiments, the flexible coupling 108 may mechanically couple the main shaft 106 to one of the third shaft S3 and the fourth shaft S4. Upon rotation of the main shaft 106 and the mechanical coupling of the main shaft 106 to one of the first shaft S1, the second shaft S2, the third shaft S3, and the fourth shaft S4, the first tool T1 rotates in the first direction d1 and the second tool T2 rotates in the second direction d2.

The purpose of the flexible coupling 108 is to transmit torque from one piece of rotating equipment to another where there is a slight amount of misalignment between the two rotating equipment. The flexible coupling 108 may obtain its flexibility from loose-fitting parts by rolling, sliding, or from both with some flexure of material. The flexible coupling 108 may include a spring, a hinge, an accordion-shaped bellow, or a ball joint. In some cases, the flexible coupling may an input coupler and an output coupler.

In some embodiments, the drive mechanism 102 further includes a first bearing B1 to rotatably support the first shaft S1 and a second bearing B2 to rotatably support the second shaft S2. The first bearing B1 assists the rotation of the first shaft S1 and the second bearing B2 assists the rotation of the second shaft S2. In other words, the first bearing B1 allows the first shaft S1 to rotate smoothly, and the second bearing B2 allows the second shaft S2 to rotate smoothly.

In some embodiments, the repair system 100 further includes a load sensor 110 mounted on one of the first shaft S1 and the second shaft S2 and configured to detect a torque of the corresponding first shaft S1 or the second shaft S2. In the illustrated embodiment of FIG. 1, the load sensor 110 is mounted on the first shaft S1 and configured to detect the torque of the first shaft S1 upon rotation of the first shaft S1. In other embodiments, the load sensor 110 may be mounted on the second shaft S2 and configured to detect the torque of the second shaft S2 upon rotation of the second shaft S2.

The load sensor 110 generally converts tension and compression forces into a corresponding electrical signal (not shown). In the repair system 100, the load sensor 110 may detect a load applied to the corresponding first shaft S1 or the second shaft S2. Through the electrical signal generated by the load sensor 110, an operator may check and validate the repair operation being performed by the repair system 100. The load sensor 110 may be a hydraulic load sensor or a pneumatic load sensor. The most common type of the load sensor 110 is a strain gauge load sensor.

In some embodiments, the repair system 100 further includes a casing 112 (shown by dashed lines in FIG. 1) at least partially enclosing the drive mechanism 102. Each of the first shaft S1 and the second shaft S2 extends at least partially outside the casing 112. In some embodiments, the casing 112 may also enclose the load sensor 110. The casing 112 may be in the form of a sleeve and at least partially houses various components of the drive mechanism 102. The casing 112 may protect the drive mechanism 102 by minimizing contact between debris and the components of the drive mechanism 102 during a repair operation. In some embodiments, a width W1 of the casing 112 is about 12 millimetres. Therefore, the repair system 100 may be used to perform repair operations in confined spaces and in-situ applications. Moreover, in some embodiments, the first tool T1 and the second tool T2 may move relative to each other so that they fit through a smaller gap. This means that the first tool T1 and the second tool T2 may be biased away and brought closer to each other such that the repair system 100 may be used based on desirable application requirements.

In some embodiments, the repair system 100 further includes a port 114 disposed between and spaced apart from the first tool T1 and the second tool T2. The port 114 may be an opening that opens up into a space between the first tool T1 and the second tool T2. In some embodiments, the port 114 allows a lubricant or a coolant to flow towards the surface 12 of the workpiece 10 which is to be repaired. Flow of the lubricant or the coolant is depicted by arrow A1. In some applications, flow of the lubricant or the coolant towards the surface 12 of the workpiece 10 may enhance the repair operation of the workpiece 10. For example, the lubricant may reduce a friction between the first tool T1 and the surface 12, and between the second tool T2 and the surface 12. In some embodiments, the port 114 allows evacuation of the debris from the surface 12 of the workpiece 10 after the surface 12 is repaired. The debris is evacuated from the surface 12 in a direction depicted by arrow A2. In some applications, evacuation of the debris from the surface 12 of the workpiece 10 may ensure smooth functioning of the workpiece 10. Repair operation of the surface 12 of the workpiece usually leads to generation of dust and debris. By using a vacuum pump (not shown), the dust and debris may be evacuated from the surface 12 through the port 114.

The repair system 100 may be used to perform repair operations, such as blending or grinding, for repairing the surface 12 of the workpiece 10. Due to the counter-rotation of the first tool T1 and the second tool T2, the repair system 100 does not deploy a single point repair tool that is generally used in conventional repair techniques for in-situ engine applications. As a result, minimal reaction forces may be generated when the first tool T1 rotates in the first direction d2 and the second tool T2 rotates in the opposing second direction d2 during the repair process, and each of the first tool T1 and the second tool T2 contacts the surface 12 of the workpiece 10 during the counter-rotation. Therefore, in comparison to conventional single point repair tools, the repair system 100 may involve relatively less reaction forces between the workpiece 10 and the first tool T1 and the second tool T2. In other words, the counter-rotation of the first tool T1 and the second tool T2 may allow cancellation of tool-workpiece engagement forces during a repair operation.

Due to the counter-rotation of the first tool T1 and the second tool T2, the first tool T1 and the second tool T2 may not deviate from a target location while repairing the surface 12 of the workpiece 10. This may reduce unwanted material removal and additional rework. The counter-rotation of the first tool T1 and the second tool T2 may offer a precise use of the repair system 100 for repair operations at deep repair locations and in-situ applications. The repair system 100 may be effectively used in repair operations of various components of aeroengines.

Moreover, the repair system 100 may reduce the required level of operator expertise thereby allowing facile automation of a repair technique. The repair system 100 may be used in micro scale application as well as macro scale applications.

Figure 2B:
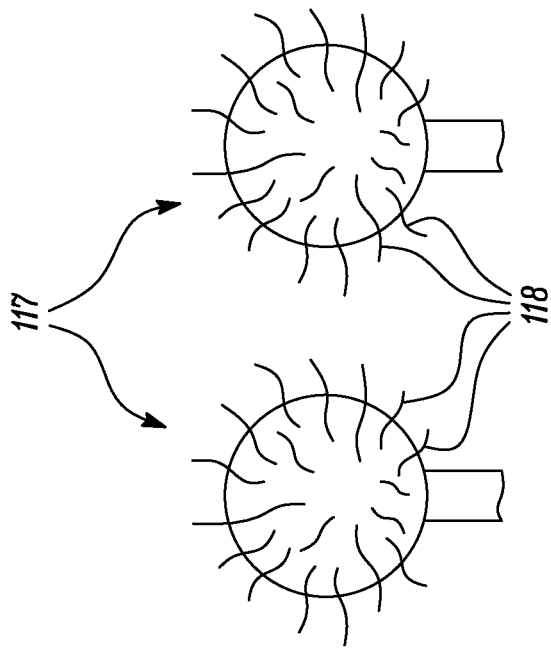
FIG. 2B is a schematic perspective view of a pair of scarifier heads configured to be mounted on the first tool and the second tool, respectively, of the repair system of FIG. 1, according to an embodiment of the present disclosure.
Figure 2A:
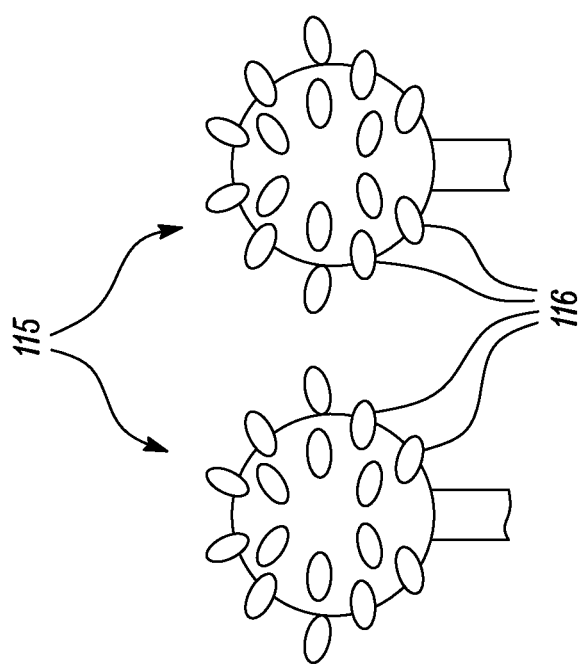
FIG. 2A is a schematic perspective view of a pair of blending heads configured to be mounted on a first tool and a second tool, respectively, of the repair system, according to an embodiment of the present disclosure.

FIGS. 2A and 2B are schematic perspective views of a pair of blending heads 115 and a pair of scarifier heads 117 configured to be interchangeably and removably mounted on the first tool T1 and the second tool T2 (shown in FIG. 1), respectively, according to an embodiment of the present disclosure. Thus, in some embodiments, the repair system 100 further includes the pair of scarifier heads 117 and the pair of blending heads 115 configured to be interchangeably and removably mounted on the first tool T1 and the second tool T2, respectively. The pair of blending heads 115 and the pair of scarifier heads 117 may be mounted on the first tool T1 and the second tool T2 by a snap-fit connection.

In some embodiments, each of the pair of scarifier heads 117 and the pair of blending heads 115 is made of a material including at least steel, tungsten carbide, or plastic. Such a material of the pair of scarifier heads 117 and the pair of blending heads 115 may enhance repair operations, such as blending or grinding. In other embodiments, the material of each of the pair of scarifier heads 117 and the pair of blending heads 115 may be steel wire, ceramic, etc.

Figure 3:
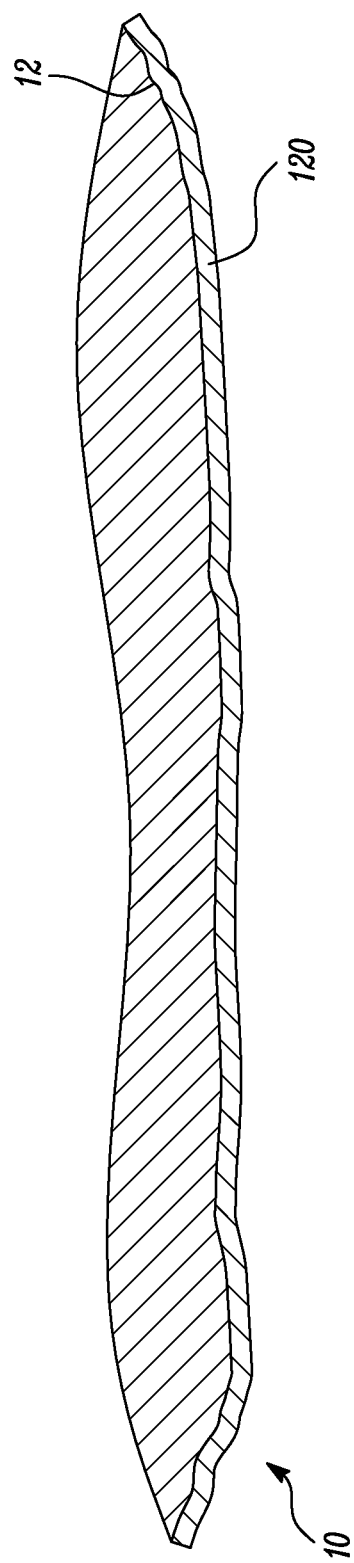
FIG. 3 is a partial schematic sectional view of a workpiece after repair operation of a surface of the workpiece by the repair system of FIG. 1 by using the pair of blending heads of FIG. 2A, according to an embodiment of the present disclosure.

Referring to FIG. 2A, each blending head 115 from the pair of blending heads 115 includes a plurality of blending members 116 for blending a material on the surface 12 of the workpiece 10 (shown in FIG. 1). In some embodiments, upon mounting of the pair of blending heads 115 on the first tool T1 and the second tool T2, respectively, the counter-rotation of the first tool T1 and the second tool T2 causes a deposition of a coating 120 (shown in FIG. 3) on the surface 12 in order to repair the surface 12 of the workpiece 10. FIG. 3 is a partial schematic sectional view of the workpiece 10 after repair operation of the surface 12 of the workpiece 10 by the repair system 100 of FIG. 1 by using the pair of blending heads 115 of FIG. 2A. The deposition of the coating 120 on the surface 12 of the workpiece 10 may increase the working life of the workpiece 10. The coating 120 may be a thermal barrier coating which causes the workpiece 10 to withstand high temperatures, temperature cycling, and stress conditions.

Referring to FIG. 2B, each scarifier head 117 from the pair of scarifier heads 117 includes a plurality of grinding members 118 for removing unwanted material from the surface 12 of the workpiece 10 (shown in FIG. 1). Upon mounting of the pair of scarifier heads 117 on the first tool T1 and the second tool T2, respectively, the counter-rotation of the first tool T1 and the second tool T2 causes a removal of the unwanted material from the surface 12 in order to repair the surface 12 of the workpiece 10.

In some embodiments, a pair of polishing heads (not shown) may also be removably mounted on the first tool T1 and the second tool T2 (shown in FIG. 1), respectively, for polishing the surface 12 of the workpiece 10. In some embodiments, a pair of cleaning heads (not shown) may also be removably mounted on the first tool T1 and the second tool T2 (shown in FIG. 1), respectively, for cleaning the surface 12 of the workpiece 10.

In some embodiments, the pair of scarifier heads 117, the pair of blending heads 115, the cleaning heads, and/or the pair of polishing heads may be interchangeably mounted on one of a six-axis robot arm, a continuum robot arm, an articulated robot arm, and the like, such that the corresponding robot arm pinpoints the location of the surface 12 of the workpiece 12.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A repair system for repairing a surface of a workpiece, the repair system comprising:
    a first tool configured to rotate in a first direction, wherein the first tool is configured to contact the surface of the workpiece during the rotation of the first tool in order to repair the surface of the workpiece;
    a second tool configured to rotate in a second direction opposite to the first direction, wherein the second tool is configured to contact the surface of the workpiece during the rotation of the second tool in order to repair the surface of the workpiece; and
    a drive mechanism coupled to each of the first tool and the second tool, wherein the drive mechanism is configured to rotate each of the first tool and the second tool and cause counter-rotation of the first tool and the second tool, such that the first tool rotates in the first direction and the second tool rotates in the second direction.

2. The repair system of claim 1, wherein the drive mechanism comprises:
    a drive motor;
    a main shaft coupled to and configured to be driven by the drive motor;
    a first shaft mechanically coupled to the first tool;
    a first gear fixed to and mounted on the first shaft;
    a second shaft mechanically coupled to the second tool;
    a second gear fixed to and mounted on the second shaft;
    a third shaft;
    a third gear fixed to and mounted on the third shaft, wherein the third gear is meshed with the first gear;
    a fourth shaft;
    a fourth gear fixed to and mounted on the fourth shaft, wherein the fourth gear is meshed with each of the second gear and the third gear; and
    a flexible coupling configured to mechanically couple the main shaft to one of the first shaft, the second shaft, the third shaft, and the fourth shaft;
        wherein, upon rotation of the main shaft and the mechanical coupling of the main shaft to one of the first shaft, the second shaft, the third shaft, and the fourth shaft, the first tool rotates in the first direction and the second tool rotates in the second direction.

3. The repair system of claim 2, further comprising a load sensor mounted on one of the first shaft and the second shaft and configured to detect a torque of the corresponding first shaft or the second shaft.

4. The repair system of claim 2, wherein the drive mechanism further comprises a first bearing to rotatably support the first shaft and a second bearing to rotatably support the second shaft.

5. The repair system of claim 2, further comprising a casing at least partially enclosing the drive mechanism, wherein each of the first shaft and the second shaft extends at least partially outside the casing.

6. The repair system of claim 5, wherein a width of the casing is about 12 millimetres.

7. The repair system of claim 1, further comprising a pair of scarifier heads and a pair of blending heads configured to be interchangeably and removably mounted on the first tool and the second tool, respectively.

8. The repair system of claim 7, wherein upon mounting of the pair of blending heads on the first tool and the second tool, respectively, the counter-rotation of the first tool and the second tool causes a deposition of a coating on the surface in order to repair the surface of the workpiece.

9. The repair system of claim 7, wherein the pair of scarifier heads are mounted on the first tool and the second tool, respectively, and the repair system is configured such that counter-rotation of the first tool and the second tool causes a removal of unwanted material from the surface in order to repair the surface of the workpiece.

10. The repair system of claim 7, wherein each of the pair of scarifier heads and the pair of blending heads is made of a material comprising at least steel, tungsten carbide, or plastic.

11. The repair system of claim 1, wherein repair system is configured to operate such that a speed of rotation of each of the first tool and the second tool is between 100 rpm and 25000 rpm.

12. The repair system of claim 1, wherein each of the first tool and the second tool is a spherical ball.

13. The repair system of claim 1, further comprising a port disposed between and spaced apart from the first tool and the second tool.

14. The repair system of claim 13, wherein the port allows a lubricant or a coolant to flow towards the surface of the workpiece which is to be repaired.

15. The repair system of claim 13, wherein the port allows evacuation of debris from the surface of the workpiece after the surface is repaired.

* * * * *